(12) United States Patent
Salter et al.

(10) Patent No.: US 10,160,380 B1
(45) Date of Patent: Dec. 25, 2018

(54) ENHANCED INFORMATIONAL VEHICLE PUDDLE LAMP ASSEMBLIES

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); James J. Surman, Clinton Township, MI (US); Ulrich Stuhec, Ann Arbor, MI (US); Cornel Lewis Gardner, Romulus, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/725,386

(22) Filed: Oct. 5, 2017

(51) Int. Cl.
| | | |
|---|---|---|
| B60Q 1/32 | (2006.01) |
| B60Q 1/26 | (2006.01) |
| B60Q 1/50 | (2006.01) |
| F21V 23/04 | (2006.01) |
| H05B 37/02 | (2006.01) |
| F21Y 115/10 | (2016.01) |
| F21Y 113/13 | (2016.01) |

(52) U.S. Cl.
CPC ............. *B60Q 1/32* (2013.01); *B60Q 1/2665* (2013.01); *B60Q 1/2696* (2013.01); *B60Q 1/503* (2013.01); *F21V 23/0435* (2013.01); *F21V 23/0471* (2013.01); *H05B 37/0227* (2013.01); *B60Q 2400/20* (2013.01); *B60Q 2400/40* (2013.01); *B60Q 2400/50* (2013.01); *F21Y 2113/13* (2016.08); *F21Y 2115/10* (2016.08)

(58) Field of Classification Search
CPC ................................ B60Q 1/2665; B60Q 1/32
USPC ........................................................ 340/425.5
See application file for complete search history.

(56) References Cited

U.S. PATENT DOCUMENTS

| | | | |
|---|---|---|---|
| 4,674,454 A | 6/1987 | Phairr | |
| 6,592,255 B1 | 7/2003 | Duroux et al. | |
| 6,914,521 B2 | 7/2005 | Rothkop | |
| 8,482,430 B2 | 7/2013 | Szcerba | |
| 9,178,371 B2 | 11/2015 | Koelsch | |
| 9,321,395 B2 | 4/2016 | Ammar et al. | |
| 2006/0232389 A1* | 10/2006 | Chu | B60R 1/00 340/425.5 |
| 2014/0191859 A1* | 7/2014 | Koelsch | H02J 7/0047 340/455 |
| 2014/0320823 A1* | 10/2014 | Ammar | B60R 1/12 353/13 |

* cited by examiner

*Primary Examiner* — Fabricio R Murillo Garcia
(74) *Attorney, Agent, or Firm* — Carlson, Gaskey & Olds (57) ABSTRACT

This disclosure details vehicle puddle lamp assemblies and methods for illuminating the puddle lamp assemblies in a manner that provides a visual indication of a vehicle interior temperature. An exemplary vehicle puddle lamp assembly includes a control module configured to control the puddle lamp assembly to selectively project an illuminated pattern onto a ground surface adjacent to the puddle lamp assembly. The illuminated pattern provides the visual indication of the vehicle interior temperature.

20 Claims, 5 Drawing Sheets

ENHANCED INFORMATIONAL VEHICLE PUDDLE LAMP ASSEMBLIES

TECHNICAL FIELD

This disclosure relates to vehicle puddle lamp assemblies and associated methods for illuminating the puddle lamp assemblies in a manner that provides a visual indication of the vehicle interior temperature.

BACKGROUND

Vehicle lighting systems include a multitude of lighting and signaling devices for illuminating the vehicle and alerting others of the vehicle's presence and driving intentions. These lighting systems typically include various lighting devices positioned at the front, rear, sides, and interior of the vehicle. Some lighting devices employ puddle lamps for projecting a beam of light onto the ground surface in an area adjacent to a vehicle door when the door is likely to be opened. The puddle lamps provide illumination to a driver or passenger of the vehicle to observe the area for approaching or stepping out of the vehicle. It may be desirable to add more functionality to the puddle lumps.

SUMMARY

A vehicle lighting system according to an exemplary aspect of the present disclosure includes, among other things, a puddle lamp assembly and a control module configured to control the puddle lamp assembly to selectively project an illuminated pattern onto a ground surface adjacent to the puddle lamp assembly. The illuminated pattern provides a visual indication of a vehicle interior temperature.

In a further non-limiting embodiment of the foregoing vehicle lighting system, the illuminated pattern includes a logo, a symbol, a word, or any combination of logos, symbols, and words.

In a further non-limiting embodiment of either of the foregoing vehicle lighting systems, the puddle lamp assembly includes a housing, a light source, and an image filter.

In a further non-limiting embodiment of any of the foregoing vehicle lighting systems, the light source and the image filter are enclosed or supported within the housing.

In a further non-limiting embodiment of any of the foregoing vehicle lighting systems, the light source is configured for emitting light through the image filter.

In a further non-limiting embodiment of any of the foregoing vehicle lighting systems, the light source is a Red, Green, Blue (RGB) light emitting diode (LED) for producing the illuminated pattern.

In a further non-limiting embodiment of any of the foregoing vehicle lighting systems, the image filter includes a light transparent film having either a positive or a negative light transparent image.

In a further non-limiting embodiment of any of the foregoing vehicle lighting systems, a sensor system is configured to sense the vehicle interior temperature and communicate a signal to the control module.

In a further non-limiting embodiment of any of the foregoing vehicle lighting systems, the control module is configured to receive a door unlock signal for determining whether to command the puddle lamp assembly to project the illuminated pattern.

In a further non-limiting embodiment of any of the foregoing vehicle lighting systems, the control module is configured to receive a distance to user signal for determining whether to command the puddle lamp assembly to project the illuminated pattern.

In a further non-limiting embodiment of any of the foregoing vehicle lighting systems, the control module is configured to receive a door unlatch signal for determining whether to command the puddle lamp assembly to project the illuminated pattern.

In a further non-limiting embodiment of any of the foregoing vehicle lighting systems, the control module is configured to receive a remote start signal for determining whether to command the puddle lamp assembly to project the illuminated pattern.

In a further non-limiting embodiment of any of the foregoing vehicle lighting systems, the control module is configured to command the puddle lamp assembly to project the illuminated pattern in a first color if the vehicle interior temperature is above a desired temperature.

In a further non-limiting embodiment of any of the foregoing vehicle lighting systems, the control module is configured to command the puddle lamp assembly to project the illuminated pattern in a second color if the vehicle interior temperature is below the desired temperature.

In a further non-limiting embodiment of any of the foregoing vehicle lighting systems, the control module is configured to command the puddle lamp assembly to project the illuminated pattern in a third color if the vehicle interior temperature is within a predefined range of the desired temperature.

A method according to another exemplary aspect of the present disclosure includes, among other things, monitoring an interior temperature of a vehicle and illuminating a puddle lamp assembly of the vehicle to provide a visual indication of the interior temperature to a person located external to the vehicle.

In a further non-limiting embodiment of the foregoing method, illuminating the puddle lamp assembly is automatically performed in response to a remote start request.

In a further non-limiting embodiment of either of the foregoing methods, illuminating the puddle lamp assembly includes providing the visual indication in a first color if the interior temperature is above a desired temperature.

In a further non-limiting embodiment of any of the foregoing methods, illuminating the puddle lamp assembly includes providing the visual indication in a second color if the interior temperature is below the desired temperature.

In a further non-limiting embodiment of any of the foregoing methods, illuminating the puddle lamp assembly includes providing the visual indication in a third color if the interior temperature is within a predefined range of the desired temperature.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle puddle lamp assemblies and methods for illuminating the puddle lamp assemblies in a manner that provides a visual indication of a vehicle interior temperature. An exemplary vehicle puddle lamp assembly includes a control module configured to control the puddle lamp assembly to selectively project an illuminated pattern onto a ground surface adjacent to the puddle lamp assembly. The illuminated pattern provides a visual indication of the vehicle interior temperature. These and other features of this disclosure are described in greater detail below.

Figure 1:
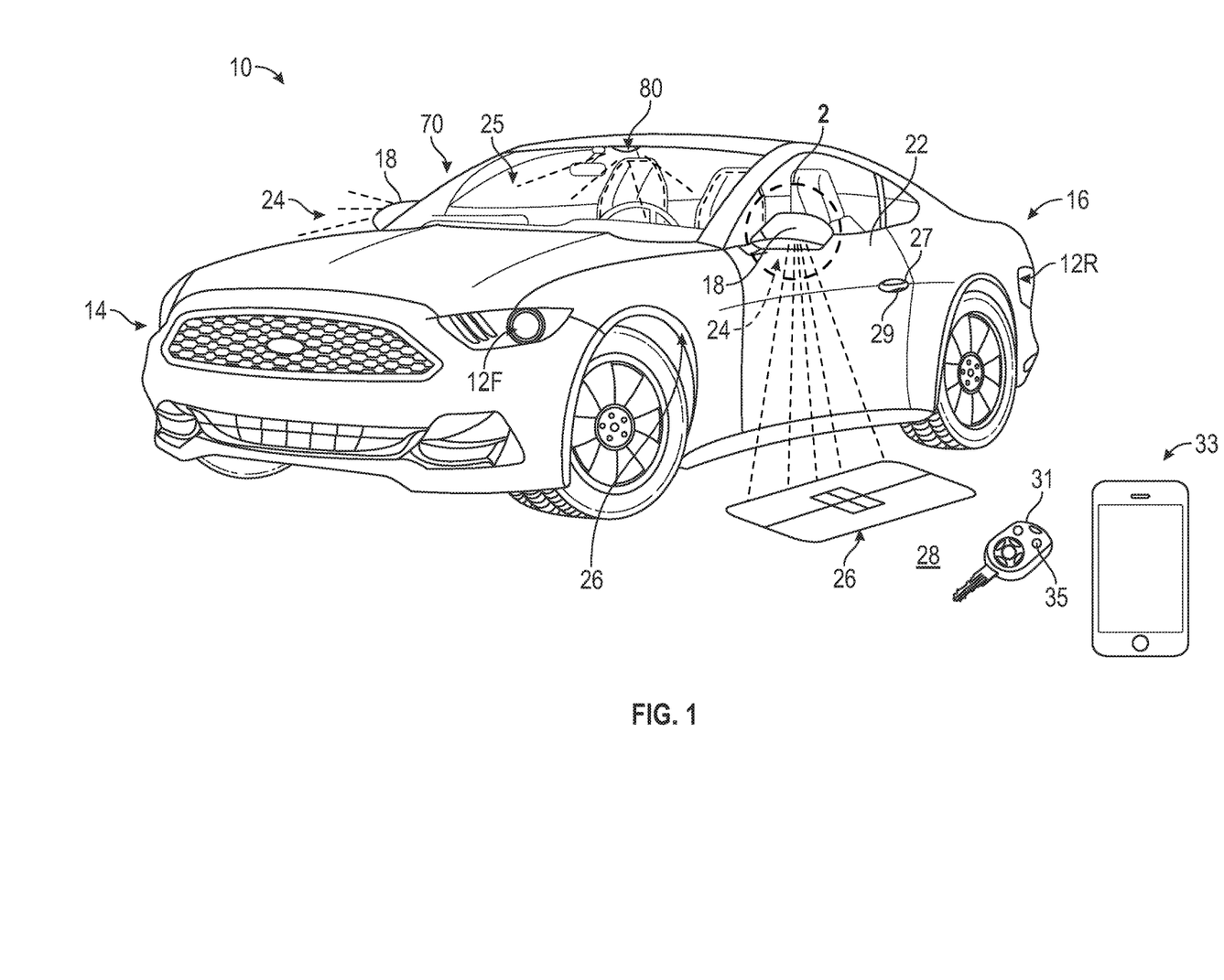
FIG. 1 illustrates a vehicle equipped with a puddle lamp assembly.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may be equipped with one or more lighting assemblies 12F located near a front portion 14 of the vehicle 10, and one or more lighting assemblies 12R located near a rear portion 16 of the vehicle 10. It should be understood that multiple lighting assemblies could be located at various other locations of the vehicle. Each lighting assembly 12F, 12R may include a multitude of lamps and signaling devices for providing exterior vehicle lighting and for alerting other drivers and/or pedestrians of the vehicle's 10 presence and to the driving intentions of the vehicle 10.

The vehicle 10 may also include a pair of side mirror assemblies 18 mounted on opposite lateral sides 20 of the vehicle 10. The side mirror assemblies 18 face toward the rear portion 16 and are generally located near front passenger doors 22. The front passenger doors 22 open and close via a handle 27 equipped with a latch mechanism to permit entrance into and out of a passenger cabin 25 of the vehicle 10.

A proximity sensor 29, such as a capacitive sensor, may be installed within the handle 27 or some other location of the door 22 for sensing the hand of the user in close proximity to the handle 27. A key fob 31 or personal electronic device (e.g., phone) 33 may be operated by a user to activate various vehicle features, including but not limited to door lock and unlock functions, remote start functions, etc.

A puddle lamp assembly 24 may be installed within each side mirror assembly 18 and is generally positioned to project an illuminated pattern 26 onto a ground surface 28 adjacent to the vehicle 10. In an embodiment, each puddle lamp assembly 24 projects the illuminated pattern 26 onto the ground surface 28 that is immediately in front of the front passenger doors 22. Although the puddle lamp assemblies 24 are shown and described as being incorporated into the side mirror assemblies 18 of the vehicle 10, it should be appreciated that the puddle lamp assemblies 24 could be incorporated into other vehicle components, such as a vehicle door handle, a vehicle door, a side fender, a bumper, a roof rail, a running board, or any other component positioned to project a lighted image onto the ground surface 28.

The illuminated pattern 26 generated by each puddle lamp assembly 24 may include any image. The illuminated pattern 26 can include a logo, symbol, word, or any combination of these. In an embodiment, the illuminated pattern 26 is a logo, such as a trademark associated with the vehicle 10. It should be understood that other patterns having different images, sizes, and light colors may be generated by each puddle lamp assembly 24 within the scope of this disclosure.

Together, the lighting assemblies 12F, 12R and the puddle lamp assemblies 24 establish a lighting system of the vehicle 10. The lighting system could include various other lighting devices within the scope of this disclosure, including but not limited to one or more interior lights 80 for illuminating the passenger cabin 25. The lighting system is capable of producing various lighting functions of the vehicle 10. The primary focus of this disclosure relates to the lighting functions generated by the puddle lamp assemblies 24.

Each puddle lamp assembly 24 may be activated in response to various user commands. In an embodiment, the puddle lamp assembly 24 is activated by actuating a button 35 on the key fob 31 when the user is within signal communication range of the vehicle 10. Upon actuation of the button 35, the vehicle puddle lamp assembly 24 is turned on to generate the illuminated pattern 26. The puddle lamp assembly 24 may remain on for a predetermined time period and may be turned off prior to the predetermined time period when a user's hand is detected by the proximity sensor 29. The illuminated pattern 26 illuminates the ground surface 28 adjacent to the vehicle 10 to enable the user to approach and access the vehicle 10 and view the ground surface 28 proximate thereto.

The puddle lamp assemblies 24 may be utilized to provide additional information to the user. As discussed in greater detail below, for example, the illuminated pattern 26 can be generated to provide a visual indication of an interior temperature of the passenger cabin 25.

Figure 2:
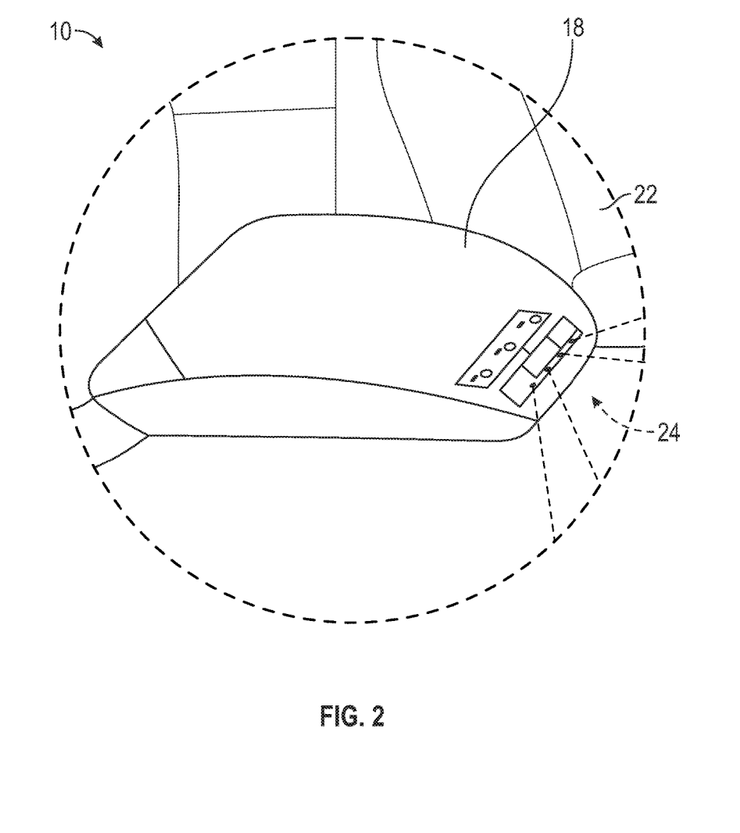
FIG. 2 is an enlarged view of the puddle lamp assembly of FIG. 1.
Figure 3:
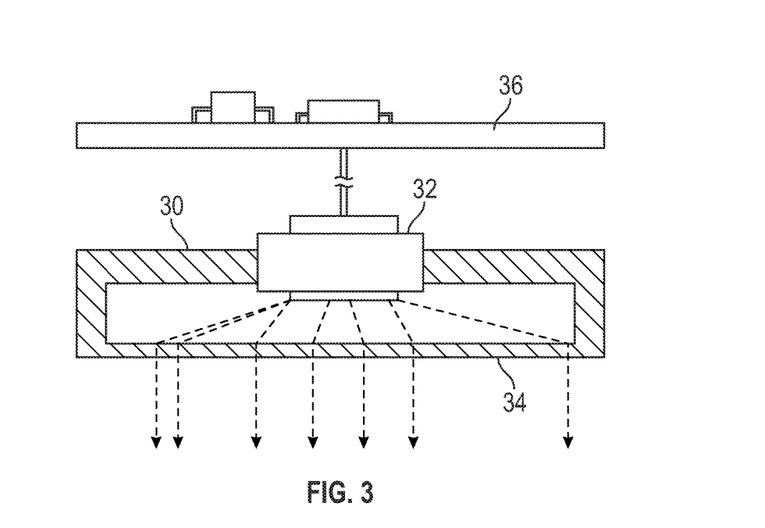
FIG. 3 is a cross-sectional view of the puddle lamp assembly of FIG. 2.

FIGS. 2 and 3 illustrate additional details of the puddle lamp assemblies 24. Each puddle lamp assembly 24 may include a housing 30, one or more light sources 32, and one or more image filters 34. The total number of light sources 32 and image filters 34 may vary depending on the type of illuminated pattern 26 being produced by the puddle lamp assembly 24, among other factors.

The housing 30 encloses and/or supports the light source 32 and the image filter 34. In an embodiment, the housing 30 is sized and shaped to provide an aerodynamic and aesthetically pleasing design within the side mirror assembly 18. However, the size and shape of the housing 30 are not intended to limit this disclosure. The housing 30 may be made of polymeric materials, metallic materials, or a combination of such materials.

Although a single light source 32 is depicted in FIGS. 2 and 3, it should be understood that the puddle lamp assembly 24 could include a multitude of light sources. The light source 32 may be an incandescent bulb, a halogen bulb, or a light emitting diode (LED). Other light sources could also be utilized within the scope of this disclosure. In an embodiment, the light source 32 is a multi-colored LED, such as a Red, Green, Blue (RGB) LED, for example.

The light source 32 may be positioned within the housing 30 and is configured to emit and direct light through the image filter 34. The light source 32 may be powered by a vehicle power supply system and may be controlled by a vehicle lighting control module 38 (see FIG. 4), for example.

The image filter 34 is arranged within the light output window of the light source 32 such that the light output by the light source 32 is illuminated onto and passes through the image filter 34 to project the illuminated pattern 26 onto the ground surface 28. In an embodiment, the image filter 34 includes a light transparent film having either a positive or negative light transparent image.

The puddle lamp assembly 24 may additionally include a printed circuit board (PCB) 36. The PCB 36 includes control circuitry including LED drive circuitry for controlling activation and deactivation of the light source 32.

Figure 4:
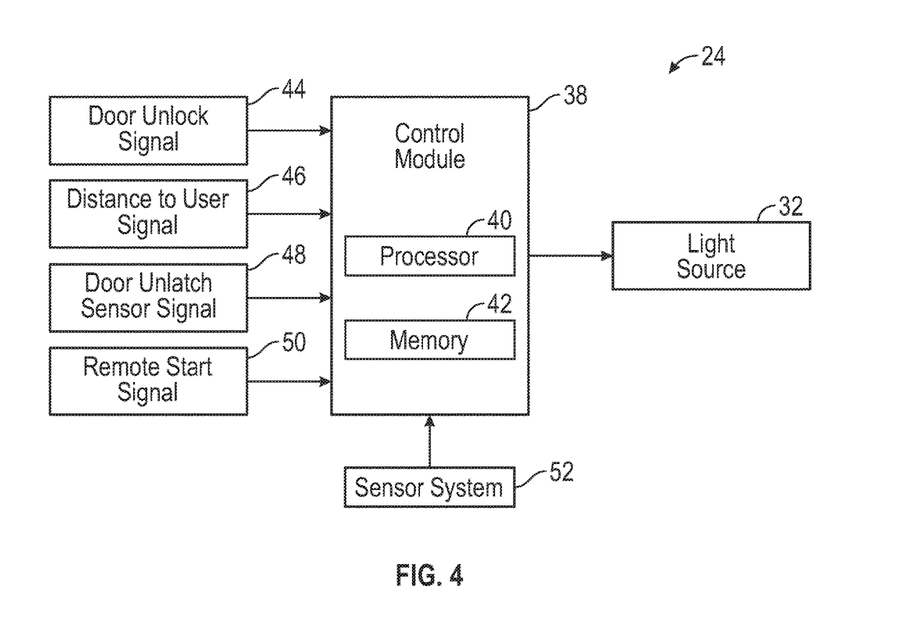
FIG. 4 is a block diagram further illustrating the puddle lamp assembly shown in FIGS. 1, 2, and 3.

Referring to FIG. 4, the puddle map assembly 24 is further illustrated as including a control module 38 for controlling each light source 32, such as by applying signals to the light source 32. The control module 38 may be an integral component of the PCB 36 or could be a separate component from the PCB 36. In an embodiment, the control module 38 includes a processing unit 40 and non-transitory memory 42 for executing the various control strategies of the puddle lamp assembly 24.

The control module 38 may receive and process various inputs to control the light source 32 in a desired manner for generating the illuminated pattern 26. A first input to the control module 38 may include a door unlock signal 44. The door unlock signal 44 may be a signal received from the key fob 31 or the personal electronic device 33 via wireless communication indicating that the user may soon be attempting to enter the vehicle 10. A second input to the control module 38 may include a distance to user signal 46. The distance to user signal 46 represents a distance that the user is detected from the vehicle 10 and indicates that the user may be approaching the vehicle 10. The distance to the user signal 46 may be generated by computing the distance between the vehicle 10 and the key fob 31 or the personal electronic device 33 of the user, for example. A third input to the control module 38 may include a door unlatch sensor signal 48. The door unlatch sensor signal 48 may be a signal sensed by the proximity sensor 29 in the door handle 27, or may be a signal detected by activation of the key fob 31 or the personal electronic device 33. A fourth input to the control module 38 may include a remote start signal 50. The remote start signal 50 may be a signal received from the key fob 31 or the personal electronic device 33 of the user indicating that that user wishes to start the vehicle 10 while the user is located remotely from (i.e. external from) the vehicle 10. In an embodiment, the remote start signal 50 includes information pertaining to climate control settings for preconditioning the temperature of the passenger cabin 25 to a desired temperature setting prior to vehicle use.

The control module 38 may also receive input signals from a sensor system 52. The sensor system 52 may include one or more temperature sensors that monitor the vehicle interior temperature (i.e., the temperature of the passenger cabin 25).

The processing unit 40, in an embodiment, is configured to execute one or more programs stored in the memory 42 of the control module 38. A first exemplary program, when executed, may determine when and how to illuminate (or, optionally, not to illuminate) the light source 32 of each puddle lamp assembly 24. In an embodiment, the control module 38 controls the puddle lamp assemblies 24 to produce the illuminated pattern 26 for providing a visual indication of the current temperature of the passenger cabin 25. The current temperature of the passenger cabin 25 may be indicated to the control module 38 via signals from the sensor system 52.

Figure 5:
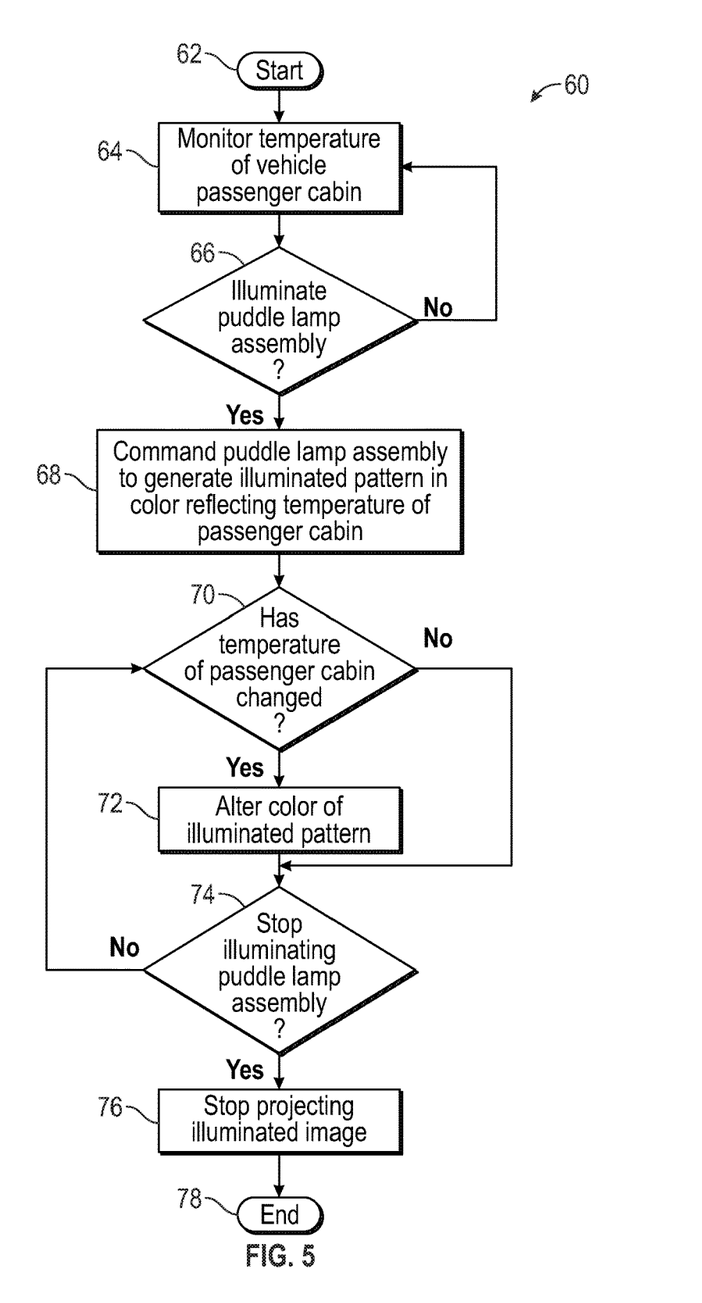
FIG. 5 schematically illustrates an exemplary method for controlling a puddle lamp assembly to produce an illuminated pattern onto a ground surface adjacent to a vehicle.

FIG. 5, with continued reference to FIGS. 1-4, schematically illustrates a method 60 for controlling the puddle lamp assembly 24 to generate an illuminated pattern 26 that provides a visual indication of the current temperature of the passenger cabin 25 of the vehicle 10. In an embodiment, the control module 38 is programmed with one or more algorithms adapted to execute the exemplary method 60.

The exemplary method 60 begins at block 62. At block 64, the control module 38 monitors the interior temperature of the passenger cabin 25. For example, the control module 38 may analyze signals periodically received from the sensor system 52 to determine a current temperature of the passenger cabin 25. In general, the temperature of the passenger cabin 25 will dictate the manner in which the illuminated pattern 26 is displayed by the puddle lamp assembly 24. For example, as further detailed below, the color of the illuminated pattern 26 may be changed to reflect the current temperature of the passenger cabin 25.

Next, the method 60 undergoes a validation sequence to determine whether or not it is appropriate to illuminate the light source(s) 32 of the puddle lamp assembly 24. For example, at block 66, the control module 38 may determine whether or not it is appropriate to command the light source 32 of the puddle lamp assembly 24 to generate the illuminated pattern 26. In an embodiment, the control module 38 makes this decision based on whether it has received any of the door unlock signal 44, the distance to user signal 46, the door unlatch sensor signal 48, or the remote start signal 50. If YES, the method 60 proceeds to block 68. If No, the method 60 returns to block 64.

At block 68, the control module 38 commands the puddle lamp assembly 24 to generate the illuminated pattern 26 in a color that visually indicates the current temperature of the passenger cabin 25. For example, the illuminated pattern 26 may be displayed in a first color (e.g., red) if the temperature of the passenger cabin 25 is above a desired temperature, may be displayed in a second color (e.g., blue) if the temperature of the passenger cabin 25 is below the desired temperature, or may be displayed in a third color (e.g., white or yellow) if the temperature of the passenger cabin 25 is within a predefined acceptable range of the desired temperature. In an embodiment, the desired temperature is set by the user, such as by using the personal electronic device 33 or a user interface located inside the vehicle 10. In another embodiment, the desired temperature may be based on a previous climate control setting from the last usage of the vehicle 10.

Optionally, the vehicle interior light 80 (see FIG. 1) may be illuminated in combination with the puddle lamp assembly 24 at block 68. Illuminating the passenger cabin 25 in addition to providing the illuminated pattern 26 extends the range of visibility for visually indicating the current temperature of the passenger cabin 25.

The control module 38 may periodically check whether the temperature of the passenger cabin 25 has changed at block 70. If yes, the control module 38 commands the light source 32 to produce the illuminated pattern 26 in a different color that matches the current temperature at block 72.

At block 74, the control module 38 determines whether it is appropriate to stop illuminating the light source 32 of the puddle lamp assembly 24. In an embodiment, this determination may be made based on the door unlatch sensor signal 48. If YES, the control module 38 commands the puddle lamp assembly 24 to stop projecting the illuminated pattern at block 76. The method 60 then ends at block 78.

Figure 6:
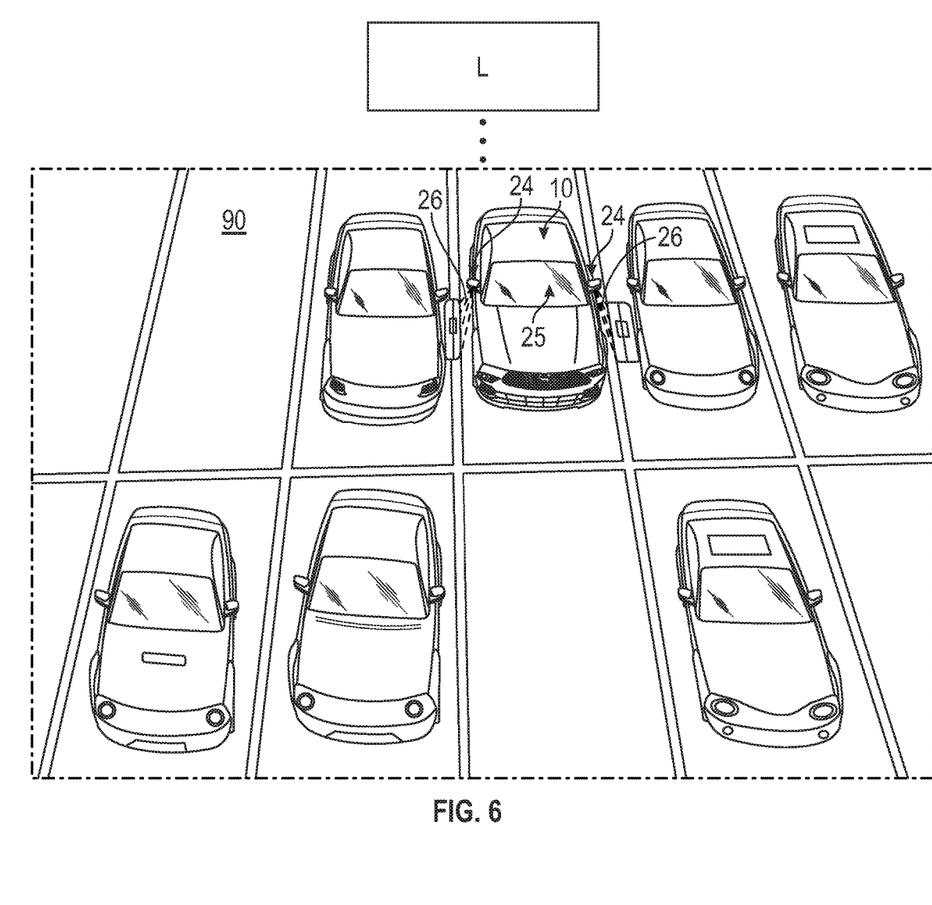
FIG. 6 schematically illustrates the use of vehicle puddle lamp assemblies for providing a visual indication of a vehicle interior temperature to a vehicle user who is remote from the vehicle.

FIG. 6 schematically illustrates an exemplary use of the puddle lamp assemblies 24 for producing illuminated patterns 26 that provide a visual indication of a vehicle interior temperature to a user who is remote from the vehicle 10. In this example, the vehicle 10 is parked in a parking lot 90 and is visible from a location L of the user. In an embodiment, the location L is completely remote from the vehicle 10 and may be elevated relative to the vehicle 10 (e.g., inside an office building that overlooks the parking lot 90, etc.).

The user may request illumination of the puddle lamp assemblies 24 for providing the visual indication of the current temperature of the passenger cabin 25. In this way, the user can determine whether the passenger cabin 25 of the vehicle 10 is at an acceptable temperature before proceeding outside to the parked location of the vehicle 10. In an embodiment, the user requests illumination of the puddle lamp assembly 24 by actuating a button 35 (e.g., lock button) of the key fob 31 or by using the personal electronic device 33 (see FIG. 1).

Additional methods may be used in combination with producing the illuminated patterns 26 in order to notify the user of the temperature of the passenger cabin 25. In a first embodiment, a wireless signal, such as a Bluetooth Low Energy (BLE) signal, can be communicated to the user's personal electronic device 33 (e.g., phone) indicating that the temperature of the passenger cabin 25 is near a desired set point. In another embodiment, the user can periodically request that the vehicle 10 send a signal to the key fob 31 indicating that the temperature of the passenger cabin 25 is within range of a desired set point. This request can be made by actuating a button 35 (e.g., lock button) of the key fob 31, for example. A light on the key fob 31 can be configured to blink in response to receiving the signal, thus indicating whether or not the temperature is near the desired set point (e.g., the light blinks green if temperature is at desired set point or blinks red if the temperature is not at desired set point). In yet another embodiment, the vehicle 10 automatically sends a signal to the key fob 31 or the personal electronic device 33 indicating that the temperature of the passenger cabin 25 is at or near the desired set point once the key fob 31/personal electronic device 33 is within a predefined range of the vehicle 10.

The vehicle puddle lamp assemblies described herein provide a visual, at a glance indication of a vehicle interior temperature by displaying an inconspicuous but visible light on the ground surface near the vehicle. When used in combination with a remote start feature, the visual indication provided by the puddle lamp assemblies allows a user to determine whether the vehicle interior temperature is an acceptable temperature before proceeding outside to the location of the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle lighting system for a vehicle, comprising:
a puddle lamp assembly of the vehicle configured to project an illuminated pattern onto a ground surface adjacent to the puddle lamp assembly; and
a control module configured to control the puddle lamp assembly to project the illuminated pattern in response to a received external command;
wherein the illuminated pattern provides a visual indication of an interior temperature of the vehicle.

2. The vehicle lighting system as recited in claim 1, wherein the illuminated pattern includes a logo, a symbol, a word, or any combination of logos, symbols, and words.

3. The vehicle lighting system as recited in claim 1, wherein the puddle lamp assembly includes a housing, a light source, and an image filter.

4. The vehicle lighting system as recited in claim 3, wherein the light source and the image filter are enclosed or supported within the housing.

5. The vehicle lighting system as recited in claim 3, wherein the light source is configured for emitting light through the image filter.

6. The vehicle lighting system as recited in claim 5, wherein the light source is a Red, Green, Blue (RGB) light emitting diode (LED) for producing the illuminated pattern.

7. The vehicle lighting system as recited in claim 3, wherein the image filter includes a light transparent film having either a positive or a negative light transparent image.

8. The vehicle lighting system as recited in claim 1, comprising a sensor system configured to sense the vehicle interior temperature and communicate a signal to the control module.

9. The vehicle lighting system as recited in claim 1, wherein the control module is configured to receive a door unlock signal for determining whether to command the puddle lamp assembly to project the illuminated pattern.

10. The vehicle lighting system as recited in claim 1, wherein the control module is configured to receive a distance to user signal for determining whether to command the puddle lamp assembly to project the illuminated pattern.

11. The vehicle lighting system as recited in claim 1, wherein the control module is configured to receive a door unlatch signal for determining whether to command the puddle lamp assembly to project the illuminated pattern.

12. The vehicle lighting system as recited in claim 1, wherein the control module is configured to receive a remote start signal for determining whether to command the puddle lamp assembly to project the illuminated pattern.

13. The vehicle lighting system as recited in claim 1, wherein the control module is configured to command the puddle lamp assembly to project the illuminated pattern in a first color if the vehicle interior temperature is above a desired temperature.

14. The vehicle lighting system as recited in claim 13 wherein the control module is configured to command the puddle lamp assembly to project the illuminated pattern in a second color if the vehicle interior temperature is below the desired temperature.

15. The vehicle lighting system as recited in claim 14, wherein the control module is configured to command the puddle lamp assembly to project the illuminated pattern in a third color if the vehicle interior temperature is within a predefined range of the desired temperature.

16. A method, comprising:
    monitoring an interior temperature of a vehicle with a sensor system; and
    in response to receiving a door unlock signal, a distance to user signal, or a remote start signal, automatically illuminating a puddle lamp assembly of the vehicle to provide a visual indication of the interior temperature to a person located external to the vehicle.

17. The method as recited in claim 16, wherein illuminating the puddle lamp assembly includes providing the visual indication in a first color if the interior temperature is above a desired temperature.

18. The method as recited in claim 17, wherein illuminating the puddle lamp assembly includes providing the visual indication in a second color if the interior temperature is below the desired temperature.

19. The method as recited in claim 18, wherein illuminating the puddle lamp assembly includes providing the visual indication in a third color if the interior temperature is within a predefined range of the desired temperature.

20. A vehicle, comprising:
    a sensor system configured to sense an interior temperature;
    a puddle lamp assembly configured to selectively project an illuminated pattern that provides a visual indication of the interior temperature; and
    a control module configured to control the puddle lamp assembly to project the illuminated pattern in a first color if the interior temperature is above a desired temperature or a second color if the interior temperature is below the desired temperature.

* * * * *